W. A. KIRBY.
Harvesting Machine.
No. 3,198. Reissued Nov. 17, 1868.
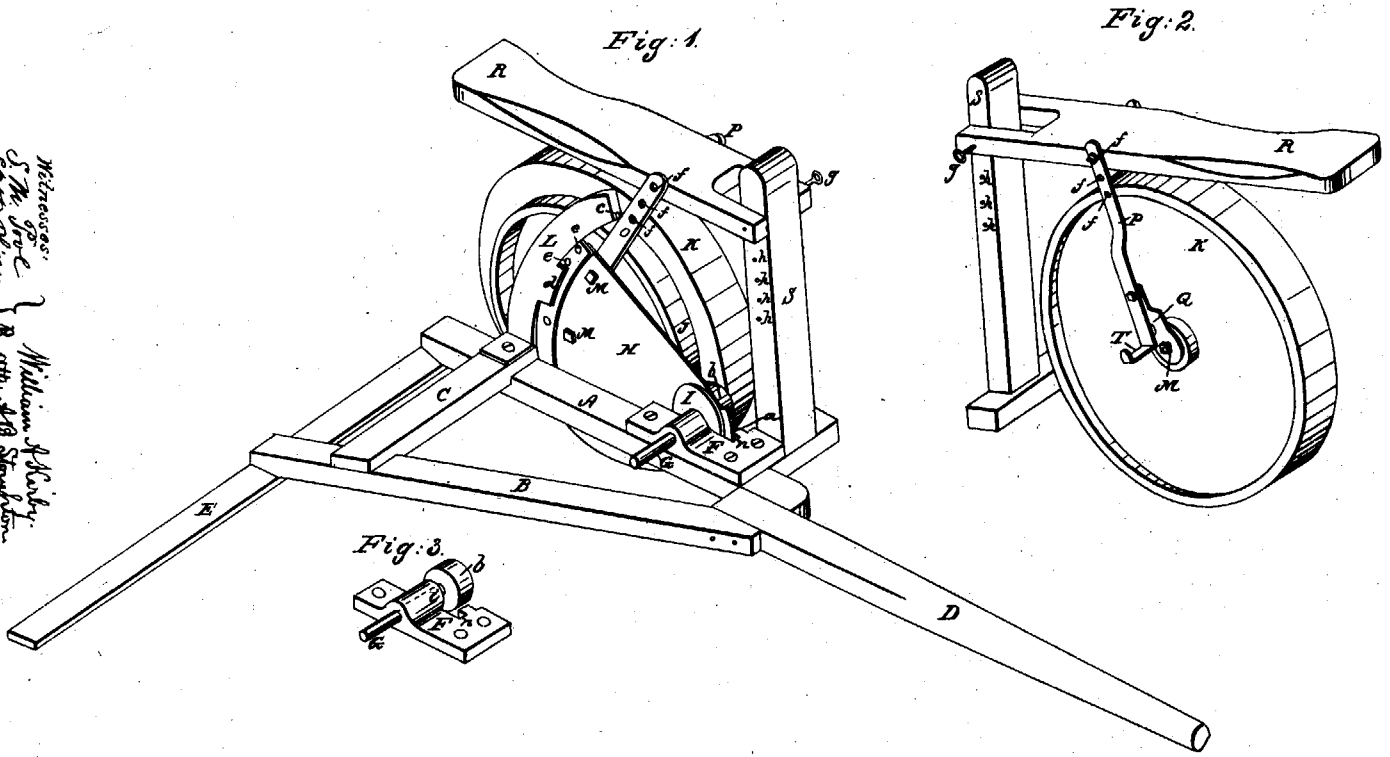
Witnesses:
S. M. Tovel
E. M. B. Phillips
William A. Kirby.
By atty A. B. Stoughton
N. PETERS. Photo-Lithographer, Washington, D. C.

UNITED STATES PATENT OFFICE.

WILLIAM A. KIRBY, OF AUBURN, NEW YORK.

IMPROVEMENT IN HARVESTING-MACHINES.

Specification forming part of Letters Patent No. 15,659, dated September 2, 1856; Reissue No. 673, dated March 15, 1859; Reissue No. 3,198, dated November 17, 1868.

*To all whom it may concern:*

Be it known that I, WILLIAM A. KIRBY, formerly residing in Buffalo, in the State of New York, now of Auburn, in the county of Cayuga and State of New York, have invented certain new and useful Improvements in Harvesting-Machines; and I do hereby declare the following to be a full, clear, and exact description of the construction and operation of the same, reference being had to the accompanying drawings, making a part of this specification, in which—

Figure 1 represents in perspective so much of a harvesting-machine as will illustrate my invention. Fig. 2 represents a perspective view taken from the opposite side of the machine from that shown in Fig. 1, and shows the manner of supporting the seat and driver on the main wheel. Fig. 3 represents in perspective a portion of the frame and gearing detached from the machine to better illustrate their characteristics.

Similar letters of reference, where they occur in the separate figures, denote like parts of the machine in all of the drawings.

This invention relates to the manner of hanging or uniting the main frame of a harvesting-machine to the main supporting-wheel, so that the main frame may be raised or lowered and balanced on the main wheel to suit the special character of the ground over which it is to be worked or the work to be done by it; and it further relates to the manner of attaching a lever-seat to the main frame and supported in part by the wheel, so that the weight of the driver may be used to aid in raising or balancing the machine and transferring the weight upon the main or drive wheel; and it further relates to the manner of forming a support for the driver where there is no main frame on which such support could be placed; and it further relates to a harvesting-machine which has no outside support for the driving-wheel, but has a support for the driver's seat attached to the outer end of the axle of said wheel; and it further relates to a harvesting-machine having its frame in two parts and hinged around or to the box containing the pinion-shaft at one point and a segment-plate and holding device at another point for sustaining and holding the frame at any desired height.

To enable others skilled in the art to make and use my invention, I will proceed to describe the same with reference to the drawings.

The main frame is of a triangular shape, A B C forming the three sides of the triangle, to which frame all the remaining portions of the machine may be and are in whole or in part connected.

The tongue D is connected to the main frame rigidly at its front and the finger-bar E at its rear.

In a suitable metallic box or block, F, on the part A of the main frame is substantially fixed a journal or shaft, G, so as to freely turn in said box or block. A hub, *i*, also projects from this block F, on which is placed a segmental or radial plate, H, said plate having a hub, I, upon it, which gives it a proper support on the projection *i* of the box F. There is also a flange or guide-piece, *a*, on the segmental plate H, which projects into a slot or recess, *n*, in the block or box F, to steady said segmental plate on its journal or bearing *i* when turning thereon, and to keep it from slipping laterally on said bearing to any injurious extent. The object and purpose of hanging the segmental plate H upon the hub or projection *i* are that it may turn on a bearing of which the shaft G is the centre, and without turning on the shaft G itself, which would from its rapid motion soon so wear itself or the hub of the plate H, or both, as to produce a shackling or noisy and irregular motion, and the object of the projection or guide *a* working in the recess *n* or against lateral supports is to keep the plate upon its bearing and prevent it from lateral motion.

A pulley, *b*, is fast on the shaft G, which may bear against a circular flange, J, on the inner face of the main driving and supporting wheel K, so as to receive motion therefrom; or *b* may be a cogged pinion and the flange J a cogged rim or flange taking into it to drive it, or an endless belt or chain may be used around the two, the object being to get motion from the main wheel and transmit it to the cutters through the shaft G, or to a reel or rake, as may be desired.

L is a segmental rim, supported on the frame-piece C and furnished with a groove or way, *c*, in its inner perimeter, in which groove or way the outer edge of the plate H moves and is supported. A projecting piece, *d*, is also formed on the inner perimeter of the rim L, against which an adjusting-pin, placed in either of the series of holes *e e*, &c., may catch to hold the frame when properly adjusted on the main wheel K.

On the segmental plate H is wrought or cast a journal, M, for supporting the main wheel K, and to said plate is also pivoted by a bolt or pin, N, a brace or support, O, provided with a series of adjusting-holes, *f f*, &c. A support or brace, P, corresponding to that, O, on the opposite side of the wheel, is pivoted to an arm, Q, connected with or fastened to the journal or axle M of the main wheel K, as seen in Fig. 2, and similarly provided with adjusting-holes *f*, &c. To these two braces or supports O P is hung a seat, R, (for the driver or conductor of the machine to ride upon,) which, besides having a pivoted connection with the supports, is also hinged and made adjustable in the standard S by a pin, *g*, which may pass through its end and through said standard at any of the adjusting-holes *h*, &c. The lower end of the brace or support P may be formed into a stirrup, T, to make a foot-support for the driver, the axle M being the main supporting part of said stirrup, inasmuch as the support P is connected to or with the axle, and thus forms the place for the stirrup. By thus pivoting the plate H, as above mentioned, to the main frame, and hanging the wheel K to said plate, and also pivoting the seat R (which is also a lever) to the plate H and the standard S, which latter is a part of or fastened to the main frame, the main frame can be raised or lowered and balanced on the wheel at pleasure; but in raising or lowering the main frame the position of the seat R changes, for it may be used as the lever by which the raising or lowering is done, and some provision must be made for bringing it back into a convenient or effective position. This is done by the adjustments heretofore mentioned in the braces O and P and standard S. By these connections, too, I not only make the adjustments that are necessary for high or low cutting with great facility, but I dispense with much of the frame-work heretofore used, and consequently make the machine lighter and cheaper than heretofore done, dispensing with any frame on the out or stubble side of the main wheel, and placing it entirely on the in or grain side of said wheel.

The peculiar position and manner of hanging the seat makes the weight of the driver or conductor on its rear portion act as a counterpoise or balance to raise and hold up the front part of the machine.

The pin used in the holes *e* of the plate H is inserted underneath the projection *d* of the rim or guide L, so that when the machine is cutting low or the frame is on or close to the ground, and the driving-wheel K should drop into a depression of any kind, it will still be in contact with the ground and continue to drive the cutters, which it could not do were it permanently adjusted to the main frame and said frame come in contact with the ground.

Any sudden jar communicated to a machine with a stiff tongue is thrown violently upon the necks of the horses; but by my manner of hanging the seat the weight of the driver, when the machine strikes any obstacle, tends to raise up the machine, ease the jar, and thus relieve the horses.

It will be perceived that I have no main frame outside of the main wheel, but simply a seat-support and a foot-rest, which are connected to the journal or axle of the main wheel, and which aid the driver in converting his seat into a lever for raising up or easing the machine over any obstruction in its path.

The triangular frame, to which all the other parts of the machine are connected, is on the cutter-bar side of the main wheel, and there is but one support to the journal or axle of the main wheel, and that on the side where the main frame is placed.

Having thus fully described my invention, what I claim under this patent, and desire to secure by Letters Patent, is—

1. The combination of the single plate H with the main wheel, substantially as and for the purpose described.

2. The combination of the main wheel K, single plate H, and rim L, when connected together and operating in the manner and for the purpose set forth.

3. Placing a vibrating wheel on the outside of the main frame, or so that the outside of said frame does not bear on the outside of the wheel, in combination with the triangular-shaped frame on the inside of the wheel, substantially as described.

4. Hanging the seat to the plate H and to the standard S in the manner and for the purpose set forth.

5. A hinged lever-seat and outside supporter therefor, in combination with a wheel having no outside frame or support, substantially as herein represented.

6. In a harvesting-machine having no outside support to the driving-wheel, attaching a support for the driver's seat to the outer end of the axle of said wheel, substantially as described.

7. In a harvesting-machine having its frame in two parts and hinged together around the box containing the pinion-shaft at one point, the plate, segment, and holding mechanism at another point for sustaining and holding the frame at any desired height, substantially as described.

WM. A. KIRBY.

Witnesses:
E. B. IVES,
F. WRIGHT.